(12) United States Patent
Grandjean (10) Patent No.: US 11,190,612 B2
(45) Date of Patent: Nov. 30, 2021

(54) PROXY FOR AVOIDING ON-LINE TRACKING OF USER

(71) Applicant: Luxembourg Institute of Science and Technology (LIST), Esch-sur-Alzette (LU)

(72) Inventor: Thierry Grandjean, Martelange (BE)

(73) Assignee: LUXEMBOURG INSTITUTE OF SCIENCE AND TECHNOLOGY (LIST), Esch-sur-Alzette (LU)

(*) Notice: Subject to any disclaimer, the term of this patent is extended or adjusted under 35 U.S.C. 154(b) by 0 days.

(21) Appl. No.: 16/954,635

(22) PCT Filed: Dec. 18, 2018

(86) PCT No.: PCT/EP2018/085461
§ 371 (c)(1),
(2) Date: Jun. 17, 2020

(87) PCT Pub. No.: WO2019/121659
PCT Pub. Date: Jun. 27, 2019

(65) Prior Publication Data
US 2020/0314200 A1 Oct. 1, 2020

(30) Foreign Application Priority Data
Dec. 18, 2017 (LU) ........................................ 100580

(51) Int. Cl.
*G06F 15/173* (2006.01)
*H04L 29/08* (2006.01)
*H04L 29/06* (2006.01)

(52) U.S. Cl.
CPC ...... *H04L 67/2861* (2013.01); *H04L 63/0414* (2013.01); *H04L 63/0884* (2013.01); *H04L 63/102* (2013.01); *H04L 63/1441* (2013.01)

(58) Field of Classification Search
CPC ............ H04L 67/2861; H04L 63/0414; H04L 63/0884; H04L 63/102; H04L 63/1441
See application file for complete search history.

(56) References Cited

U.S. PATENT DOCUMENTS 6,185,598 B1 * 2/2001 Farber ..................... G06F 9/505
709/200
9,467,424 B2 * 10/2016 Gluck ................. G06F 16/9038
(Continued)

FOREIGN PATENT DOCUMENTS

| GB | 2505216 A | 2/2014 |
|----|-----------|--------|
| WO | 03/036534 A2 | 5/2003 |
| WO | 2006/052714 A2 | 5/2006 |

OTHER PUBLICATIONS

International Search Report, Application No. PCT/EP2018/085461, dated Mar. 18, 2019, 3 pages.
(Continued)

*Primary Examiner* — Richard G Keehn
(74) *Attorney, Agent, or Firm* — Rankin, Hill & Clark LLP (57) ABSTRACT

The invention provides a method that allows to counter tracking mechanisms to which user terminals are exposed when they communicate data on the Internet. This is achieved by a proxy 5 system, which conceals the activity of user terminals from such tracking mechanisms. At the same time, the proxy system builds an enriched and detailed activity and user profile, to which third parties may be granted conditional access.

18 Claims, 3 Drawing Sheets

(56) References Cited

U.S. PATENT DOCUMENTS

| | | | | |
|---|---|---|---|---|
| 2002/0112187 A1* | 8/2002 | Dalton, Jr. | .......... | H04L 63/0823 |
| | | | | 726/14 |
| 2002/0120874 A1* | 8/2002 | Shu | .......... | H04L 1/06 |
| | | | | 726/26 |
| 2008/0209028 A1* | 8/2008 | Kurup | .......... | H04L 29/06 |
| | | | | 709/224 |
| 2008/0215755 A1* | 9/2008 | Farber | .......... | H04L 67/2895 |
| | | | | 709/245 |
| 2010/0223358 A1* | 9/2010 | Schneider | .......... | H04L 63/0884 |
| | | | | 709/219 |
| 2012/0271809 A1* | 10/2012 | Lyon | .......... | G06F 16/951 |
| | | | | 707/706 |
| 2013/0031191 A1* | 1/2013 | Bott | .......... | H04L 43/04 |
| | | | | 709/206 |
| 2013/0173756 A1* | 7/2013 | Luna | .......... | H04L 67/2828 |
| | | | | 709/219 |
| 2014/0321448 A1* | 10/2014 | Backholm | .......... | H04L 69/16 |
| | | | | 370/338 |
| 2016/0191532 A1* | 6/2016 | Seiver | .......... | H04L 63/101 |
| | | | | 726/4 |
| 2016/0359879 A1* | 12/2016 | Deen | .......... | G06F 16/174 |
| 2017/0078322 A1* | 3/2017 | Seiver | .......... | H04L 41/12 |
| 2017/0116552 A1* | 4/2017 | Deodhar | .......... | G06Q 10/06316 |
| 2017/0228673 A1* | 8/2017 | Jury | .......... | G06Q 10/10 |
| 2018/0005323 A1* | 1/2018 | Grassadonia | .......... | G06Q 40/02 |

OTHER PUBLICATIONS

Bujlow, et al. "A Survey on Web Tracking: Mechanisms, Implications, and Defenses", Proceedings of the IEEE, IEEE. New York, U.S., vol. 105, No. 8, Aug. 1, 2017, 34 pages.

* cited by examiner

PROXY FOR AVOIDING ON-LINE TRACKING OF USER

TECHNICAL FIELD

The present invention lies in the field of communication systems.

BACKGROUND OF THE INVENTION

When a user is browsing the World Wide Web, or uses other Internet services, her or his activity on the Internet gives rise to a specific profile. The profile encompasses but is not limited to the history of visited Web sites, e-mail correspondence, online shopping behaviour and accessed media such as audio and video data. Several mechanisms exist and are used by Internet service providers and Web site operators to track the user's behaviour in order to establish an representation of the user's profile, that reflects the user's behaviour as completely and accurately as possible. Often without the awareness of the user, data that describes her/his profile is being collected using a wide range of technologies. The possible usages of the collected data are manifold and include the provision of targeted online advertisements based on the user's preferences, which are inferred from a user profile established from the collected data.

The technical mechanisms allowing for user tracking include but are not limited to the use of cookies, which are data files written onto a user's web surfing device by a visited website, the data content of which may be read and/or altered by the same or by other websites. Fingerprinting methods uses a wide range of technologies for tracking the location from which internet requests originate or for example the devices from which they originate and the software that is run by a user. Other known mechanisms allow the inspection of data that is cached in a memory element of a user device. The tracked user does not necessarily have control over which of his personal data is transmitted to, used by, or visible by whom.

Methods have been proposed that aim at blocking any form of tracking of a user's behaviour on public communication networks, such as the Internet. While such solutions increase the respect of the user's online privacy, they also severely limit the usefulness that the user may gain from such tracking. For example, a user may well be interested in receiving a targeted advertisement, while she/he may not be interested in providing third parties with a comprehensive set of personal information.

There is a need for technical solutions that allow for, or improve on, an Internet user's control over which personal data is being transmitted to remote servers, or which personal data is being collected by remote servers.

Technical Problem to be Solved

It is an objective to present method and device, which overcome at least some of the disadvantages of the prior art.

SUMMARY OF THE INVENTION

In accordance with a first aspect of the invention, a method of handling data traffic is provided. The method comprises the following steps:
establishing a data connection between a user terminal, which is associated with a specific user, and a proxy system;
at the proxy system, handling data traffic from/to the user terminal to/from at least one destination server in a communication network, wherein the proxy system receives/transmits said data traffic on behalf of said user terminal;
at the proxy system, maintaining a profile database comprising data describing the user terminal's activity, as well as the activity of other terminals associated with the same user, on said communication network;
at the proxy system, concealing data describing the previous activity of any of a plurality of terminals associated with said same user on said communication network from the destination server to avoid online tracking of said user, wherein the concealed data has been handled by the proxy system.

In accordance with another aspect of the invention, a method of handling data traffic is provided. The method comprises the following steps:
a) establishing a data connection between a user terminal, which is associated with a specific user, and a proxy system;
b) at the proxy system, handling data traffic from/to the user terminal to/from at least one destination server in a communication network, wherein the proxy system receives/transmits said data traffic on behalf of said user terminal;
c) at the proxy system, maintaining a profile database comprising data describing the user terminal's activity, as well as the activity of other terminals associated with the same user, on said communication network;
d) at the proxy system, concealing data describing the previous activity of any of a plurality of terminals associated with said same user on said communication network from the destination server to avoid online tracking of said user, wherein the concealed data has been handled by the proxy system.
e) at the proxy system, receiving a request to access said profile database from a third-party network node, and conditionally granting the third-party node access to at least a part of the data stored in said database, based on predetermined requirements.

In accordance with another aspect of the invention, a method of handling data traffic is provided. The method comprises the following steps:
aa) establishing a data connection between a user terminal, which is associated with a specific user, and a proxy system;
bb) at the proxy system, handling data traffic from/to the user terminal to/from at least one destination server in a communication network, wherein the proxy system receives/transmits said data traffic on behalf of said user terminal,
cc) at the proxy system, maintaining a profile database comprising data describing the user terminal's activity, as well as the activity of other terminals associated with the same user, on said communication network;
dd) at the proxy system, concealing data describing the previous activity of any of a plurality of terminals associated with said same user on said communication network from the destination server to avoid online tracking of said user, wherein the concealed data has been handled by the proxy system;
and wherein. and wherein handling data traffic at step bb) further comprises:
at the proxy system, receiving a first request from the terminal that is addressed to a destination server and comprising first data;

at the proxy system, using data processing means, retrieving second data that is related to said first data from the profile database, at the proxy system, forwarding at least one second request to the destination server, wherein said at least one second request comprises said first and said second data;

Preferably, the data processing means may be configured to generate a profile database query comprising terms retrieved from said first data.

Further preferably, the data processing means may be configured to generate a profile database query comprising terms semantically related from terms retrieved from said first data.

The method may further comprise the step of, at the proxy system, receiving a request to access said profile database from a third-party network node, and conditionally granting the third-party node access to at least a part of the data stored in said database, based on predetermined requirements.

Preferably, after step a) or aa), the method may comprise the step of at the proxy system, subsequently generating at least one virtual machine environment associated with said user, wherein the virtual machine environment handles data traffic from/to the user terminal to/from at least one destination server in a communication network and stores data describing the activity of the user on said communication network within said virtual machine environment, wherein the proxy system maintains in said profile database data describing the activity of each virtual machine environment associated with the same user on said communication network, and wherein data describing the previous activity of any virtual machine environment associated with said user is concealed from the destination server.

In accordance with another aspect of the invention, a method of handling data traffic is provided. The method comprises the following steps:

aaa) establishing a data connection between a user terminal, which is associated with a specific user, and a proxy system;

bbb) at the proxy system, subsequently generating at least one virtual machine environment associated with said user, wherein the virtual machine environment handles data traffic from/to the user terminal to/from at least one destination server in a communication network and stores data describing the activity of the user on said communication network within said virtual machine environment, ccc) at the proxy system, maintaining a profile database comprising data describing the virtual machine environment's activity, as well as the activity of other terminals and/or virtual machine environments associated with the same user, on said communication network;

ddd) at the proxy system, concealing data describing the previous activity of any of a plurality of terminals and/or virtual machine environments associated with said same user on said communication network from the destination server to avoid online tracking of said user, wherein the concealed data has been handled by the proxy system;

Preferably, the proxy system may store the data describing the activity of a virtual machine environment, that has been stored within said environment, in said profile database only when the terminal instructs the proxy-system to shut down and/or destroy said virtual machine environment Preferably, the virtual machine environment may be destroyed when the data connection between the terminal and the proxy system is shut down.

Preferably, once a new data connection between a terminal and the proxy system is established, the virtual machine environment provides an empty web-browsing environment. Alternatively, predetermined data from the profile database may be pre-loaded into the web-browsing environment Step b) or bbb) may further preferably comprise the steps of:

at the proxy system, receiving a first request from the terminal that is addressed to a destination server and comprising first data;

at the proxy system, using data processing means, retrieving second data that is related to said first data from the profile database, at the proxy system, forwarding at least one second request to the destination server, wherein said at least one second request comprises said first and said second data.

The method may further preferably comprise the step of:

at the proxy system, receiving a request to access said profile database from a third-party network node, and conditionally granting the third-party node access to at least a part of the data stored in said database, based on predetermined requirements.

Preferably, the proxy system may hide at least part of the data identifying said user terminal and/or at least part of the data identifying said proxy system on said communication network from said destination server.

The method may preferably, comprise the additional step of:

at the proxy system, conditionally granting third-party access to at least a part of the data stored in said profile database, based on predetermined requirements.

Preferably, the method may further comprise the steps of:

collecting, at the user terminal, data describing the user terminal's local activity and transmitting said information to said proxy system;

receiving said data describing the user terminal's local activity at the proxy system and storing at least part of it in said profile database.

The data describing the user terminal's local activity may preferably comprise information on which applications are executed on said user terminal. Preferably, the data describing the user terminal's local activity may comprise data gathered by the terminal using at least one sensor embedded in said terminal. The sensor may for example be a microphone, a camera, an accelerometer, or a Global Positioning System, GPS, receiver.

Preferably, the data describing the user terminal's local activity is received at the proxy system via said data channel.

The data traffic handled by said proxy system may preferably comprise world-wide-web data traffic and/or e-mail data traffic.

The data comprised in said profile database may preferably include the web-browsing history of any terminals associated with said user, and/or data comprised in cookies set by destination servers that are contacted by any of said terminals.

Preferably, the data comprised in said profile database may include data files transmitted by any terminal associated with said user terminal to said proxy system.

The proxy system may preferably grant access to a predetermined part of the data stored in said profile database to a predetermined third-party subject to the authentication of said third party.

Preferably, said third party may be a proxy system as defined by aspects of the invention, which is associated with a different user.

Preferably said authentication is performed by a trusted authentication node in said communication network. The authentication node may preferably be trusted by any proxy system, terminal and third party in said communication network.

Preferably, the authentication of said third party may comprise the use of a multi-factor authentication method.

The proxy system may further preferably comprise at least one computing node in said communication network, which is remotely accessible from said user terminal.

Preferably, the proxy system may comprise a device that is physically interfaceable with said user terminal.

Said user terminal may preferably comprise a computing device, a communication device such as a smartphone, or any device connected to said communication network, the device being associated with said user.

Preferably, the proxy system may handle data traffic and may maintain a profile database in relation with terminals associated with only one user. Further, a proxy system repository may preferably store data that identifies said proxy system on said communication network, and that associates said proxy system with said user.

Said proxy system repository further preferably stores data that identifies a plurality of said proxy systems on said communication network, and that associates said plurality of proxy systems with one user each.

In accordance with yet another aspect of the invention, a system comprising a communication interface, at least one memory element and a processor is provided. The system is remarkable in that the processor is configured for:
- establishing, using the communication interface, a data connection to a user terminal, which is associated with a specific user;
- handling data traffic from/to the user terminal to/from at least one destination server in a communication network, wherein handling comprises receiving/transmitting said data traffic on behalf of said user terminal;
- maintaining a profile database comprising data describing the user terminal's activity, as well as the activity of other terminals associated with the same user, on said communication network;
- concealing data describing the previous activity of any of a plurality of terminals associated with said same user on said communication network from the destination server to avoid online tracking of said user, wherein the concealed data has been handled by the system;
- receiving a request to access said profile database from a third-party network node, and conditionally granting the third-party node access to at least a part of the data stored in said database (110, 210), based on predetermined requirements.

Preferably, the system may be distributed among a plurality of computing nodes in a communication network.

The processor may preferably be further configured for performing the method in accordance with any variants of the aspects of the invention.

In accordance with another aspect in accordance with the invention, a method for accessing a user's profile database is provided. The method comprises the following steps:
- transmitting a user database access request from a requesting terminal to a proxy system repository;
- at the proxy system repository, authenticating said requesting terminal and providing data identifying said user's proxy system to said requesting terminal;
- granting access to predetermined data stored in said proxy system's user profile database to said requesting terminal.

The proxy system repository may preferably comprise at least one network node comprising a processor and a data storage element. The data storage element may preferably comprise a database for storing said data identifying said proxy systems on the communication network. Alternatively, the proxy system may comprise a distributed database stored among a set of network nodes. The distributed database may preferably comprise a blockchain.

According to another aspect of the invention, a computer program comprising computer readable code means is provided, which when run on a computer, causes the computer to carry out the method in accordance with aspects of the invention.

According to yet another aspect of the invention, a computer program product comprising a computer-readable medium on which the computer program according to aspects of the invention is provided.

The invention provides a method that allows to counter tracking mechanisms to which user terminals are exposed when they communicate data on the Internet. This is achieved by a proxy system method, which conceals the activity of user terminals from such tracking mechanisms. At the same time, the proxy system builds an enriched and detailed activity and user profile, to which third parties may be granted conditional access.

Embodiments of the present invention allow an Internet user to control which data, including personal data, is made available to third party web servers and/or other users, without blocking data collection by third parties altogether. Traffic originating at any device of the same user is routed through the same proxy, which is therefore able to centrally concentrate any data describing the user's application usage, device usage or web history and behaviour in a user profile database. Data files may also be uploaded by the user to her/his profile database. As a general rule, any data in the user's profile is by default concealed by the proxy from any third party, such as a visited web server or another user. A user-defined set of rules at the proxy defines exceptions to such concealment. In accordance with embodiments of the invention, a third party has to authenticate itself first, in order to gain access to a user's proxy. If the proxy's rules comprise a concealment exception for the authenticated third party, data from the user's profile database that is specified in the exception is made available to the third party. If the third party is a Web server, such as an online vending service, it may thereby gain user information that is more comprehensive than information it would be able to obtain from the same user using its own dedicated tracking efforts, thereby allowing for increased quality of service with respect to the user. An online vending service may therefore reduce their own profiling efforts and gain access to more comprehensive user profile information on request. At the same time, only those entities approved by the user will possibly be able to access any of the data contained in the user's profile database. Different Web servers may obtain different data or data provided at a different level of detail or granularity. If the third party is another user using her/his own proxy service in accordance with embodiments of the invention, data may be exchanged between the proxies of such users on a peer-to-peer basis if the users are authenticated and their respective proxies have been set up with the appropriate rules, i.e., concealment exceptions.

BRIEF DESCRIPTION OF THE DRAWINGS

Several embodiments of the present invention are illustrated by way of figures, which do not limit the scope of the invention, wherein.

DETAILED DESCRIPTION OF THE INVENTION

This section describes aspects of the invention in further detail based on preferred embodiments and on the figures. The figures do not limit the scope of the invention. Unless otherwise stated, similar concepts are references by similar numerals across embodiments. For example, references 100 and 200 each refer to a proxy system, in accordance with a first and second embodiment of the invention.

Throughout the description, and unless otherwise specified, the following terminology will be adhered to.

User terminal—this wording is used to describe any computing device that is equipped with a wired or wireless networking interface, and that can be attributed to a user. Examples of a user terminal include but are not limited to a Personal Computer, PC, a laptop computer, a smartphone, a tablet computer, a smart television, a smart home appliance, e.g. a fridge equipped with a networking interface, smart glasses, a smart watch, wearable connected devices, connected vehicles, smart Internet of Things, IoT, objects and the like.

Proxy system—this wording is used to describe any computing system that is capable of providing the functions described herein for the proxy system. The proxy system may for example comprise a computing device having a processor and persistent storage, the computing device running an operating system, providing a network firewall, and having access to an information storage system, such as a file system, or a structured database. The computing device has at least one networking interface for transmitting/receiving data to/from a user terminal either through a wired or wireless data communication channel. The computing device has at least one further networking interface for transmitting/receiving data to/from a destination server. Alternatively, the proxy system may comprise a plurality of computing devices being connected in a data communication network, the computing and storage resources of which collaboratively provide at least the aforementioned services. Alternatively, the proxy system may be a user device having a physical connection interface for connecting to a user terminal, such as a Universal Serial Bus, USB, connector, for example. In all instances, the proxy system preferably comprises at least one Virtual Machine software environment in which a dedicated instance of said operating system is attributed to a single user, said user being associated with at least one, but possibly a plurality, of user terminals. This architecture allows to logically separate any data handled for a specific user's terminals from that of any other user's terminals, while being able to use the same hardware components. The aforementioned alternatives are equivalent in view of the present invention, unless stated otherwise.

Blockchain—the wording is used to a potentially continuously growing list of records, called blocks, which are linked and secured using application of cryptographic algorithms. Each block typically contains a hash pointer as a link to a previous block, a timestamp and transaction data. A blockchain may be described as a distributed ledger for recording data or transactions, the ledger being inherently resistant to modification of the data. Details about Blockchain technology are outlined for example in Bashir, Imran, "Mastering Blockchain: Deeper insights into decentralization, cryptography, Bitcoin, and popular Blockchain frameworks", Packt Publishing Ltd., 2017.

Figure 1:
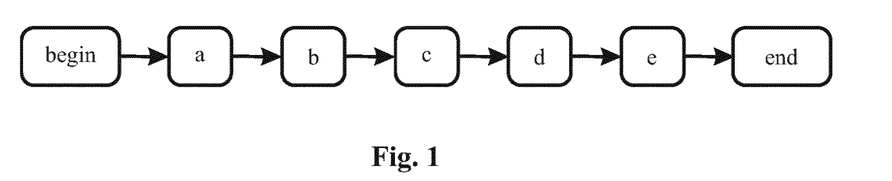
FIG. 1 illustrates the sequence of the main method steps according to a preferred embodiment of the invention.
Figure 2:
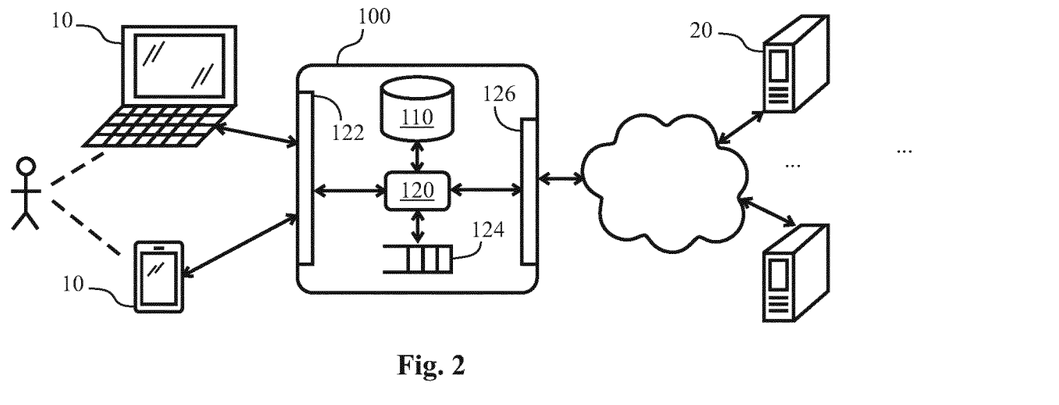
FIG. 2 provides a schematic illustration of a proxy system in accordance with a preferred embodiment of the invention, and its interactions with a user terminal and a destination server.

FIG. 1 shows the main method steps according to an embodiment of the invention and as specified in claim 1 attached hereto, while FIG. 2 illustrates a proxy system 100, that interacts with at least one user terminal 10 and with at least one destination server 20 while implementing the method steps shown in FIG. 1.

At a first step, a data connection is established via a data communication channel between a user terminal 10, which is associated with a specific user, and a proxy system 100. Both user terminal 10 and the proxy system include a networking interface that is capable of transmitting/receiving data using the data communication channel. The connection is preferably a secured communication which is substantially resistant to eavesdropping by a third party. It may for example be established using the Transport Layer Security, TLS, protocol, which is known in the art. The establishment of the data connection marks the beginning of a communication session between the user terminal and the proxy system. During or prior to the setup of the communication session, the user terminal's data processor and operating system is configured to send all future outgoing data requests, having any network destination, to the proxy system's network address.

Beside the networking interface 122, the proxy system comprises at least one data processor 120 operatively connected to a memory element 124, such as a Random-Access Memory, RAM, element, a hard disk drive and/or a Solid-State Drive, SSD, and to a structured data repository 110, which may for example be implemented by a Structured Query Language, SQL, database residing on the hard disk drive or the SSD. While data received from and transmitted to the user terminal 10 transits through the first networking interface 122, a second networking interface 126 is used to transmit and receive data to/from a destination server 20 residing on a communication network, such as the Internet.

During a communication session, any data request transmitted from the user terminal 10 and addressed to a destination server 20 is encapsulated at the terminal in data packets having the proxy system 100 as destination. Upon reception of such a data request from the user terminal 10, the proxy system 100 forwards the request to the destination server 20 on behalf of the user terminal, and stores the network address 10 as the original source address in a memory element. Thereby, the proxy system 100 handles the data traffic originating at the user terminal and having server 20 as destination, on behalf of the user terminal. Similarly, if the request is answered by the server 20, the reply is received by the proxy system, and then forwarded to the original source address of the request, i.e., to the user terminal 10. The proxy system 100 similarly handles data requests originating at any other user terminals 10 associated with the same user, as indicated on FIG. 2.

By doing so, the proxy system 100 conceals user terminal 10 from the server 20, so that the latter cannot conclude that the request originated at the user terminal 10. Instead, the destination server 20 receives a data request originating from the proxy system. In a preferred embodiment, the proxy system may periodically, such as every few hours or minutes, dynamically change its own network address, so that the destination server 20 will not be able to attribute consecutive data requests received from the proxy system to the same originating network address. Further, the proxy system may use several intermediate routing hops to contact the server 20, rather than contacting it directly. The server 20 is further not able to set a data cookie on the user terminal, and to actively profile the user terminal's activity on the communication network.

A copy of any data that is received at the proxy system 100 either from the user terminal 10 or having the user terminal 10 as its destination, is preferably stored at the proxy system 100, or in a data storage 110 accessible remotely by the proxy system. The data storage is structured as a database so that data stored therein is retrievable by way of structured queries, as is known in the art. The data stored in the database 110 emanates from any user terminal 10 associated with the same user, and therefore contributes to the user's profile. The profile inherently keeps a trace of all activity of said user, originating from any of the user terminals associated with the user, and having any third party or server as its destination. Preferably, the proxy system is configured to grant access only to user-approved terminals. To that aim, the proxy system 100 provides a security layer including a firewall and authentication functionality, dedicated to avoid unauthorized access to the proxy system. This allows to prevent unauthorized user terminals to send their data traffic through the proxy system, which would otherwise contaminate the user's profile database content.

The content of the user profile database is updated upon each reception of data originating from or destined to any terminal of a given user. At the same time, the content of the user profile database is inaccessible as such to any destination server 20. The previous activity of the user on the communication network is thereby concealed from any such destination server.

In accordance with a preferred embodiment, the proxy system is configured to accept profile consumption or profile access requests from third-party network nodes, which have or have not been connected earlier to a terminal associated with a user. The profile database comprises information defining items that may be shared with any third-party, or with a particular identified third-party. Upon authentication of the third-party, which may be effectuated by the proxy system or by a separate authentication service, the third party is granted access to those data in the profile database, which have been marked as being sharable. This allows the user, whose activities on the communication network are stored in the profile database, to remain in control over the release of the bulk of the data that is contained therein. At the same time, if the user choses to do so, partial or targeted information from the profile database may be release upon request of a third party. The data that is released to the third-party is targeted and has been cleared by the user.

In accordance with another preferred embodiment, the proxy system associates a virtual machine environment to every session that is established by a terminal that is associated with a user. Several container-based technologies may be used to that effect, for example VMWare™, VirtualBox™ Zen™, or Docker™, all of which are well known in the art. The functioning of these technologies will not be explained in further detail in the context of this invention. Preferably, once a session between a terminal and the proxy system 100 is initialized, the virtual machine environment provides an empty web-browsing environment. Alternatively, predetermined data from the profile database may be pre-loaded into the web-browsing environment. Only pre-cleared profile data will be available to a destination server. The virtual machine environment handles traffic from/to the terminal to/from any destination server and preferably stores data describing the user's activity within the initiated session in a memory element that is local to the virtual machine environment. The network activity of any virtual machine environment/session that is associated with the same user is preferably stored later in the same common profile database by the proxy system. Preferably, the data describing the activity of a session is transferred by the proxy system to the common profile database as the session, and the virtual machine environment associated with the session, is being closed or shut down, or destroyed. The proposed architecture allows a user to quickly switch from one virtual machine environment to another from the same physical terminal, wherein each virtual machine environment may be preconfigured to grant a destination server access to different subsets of data from within the user's profile database.

In accordance with a further embodiment of the invention, the proxy system comprises a data processor which intercepts requests from the terminal to the destination node, and changes not only the addressing data of the intercepted data packets, but potentially also their content. The terminal may for example send a request for searching for a particular book to a destination server. This request is handled by the proxy system 100. The prior activity and any prior requests of the terminal remain concealed to the destination server by the proxy system, so that the destination server, which may for example be an online book vending service, considers the request as-such, without having access to other references of the terminal or its associated user. While the privacy of the user with which the terminal is associated remains protected, the quality of service provided by the destination node, as observed by the terminal, may be perceived as being poor. In accordance with this embodiment, the data processor of the proxy system queries the profile database for data that has been previously stored therein, and which related to the initial request that has been intercepted. The profile database may for example be queried for similar requests, requests sent to the same destination node, any requests for books, or requests that are semantically linked to the initial request. Instead of transmitting the initial request as-is to the destination server. The proxy system 100 then proceeds with including the data retrieved from the profile database in the request that it forwards to the destination server, or possibly forwards multiple related requests. These requests are transparent to the terminal, which is not aware of their content. By taking these steps, the destination server receives an enriched request, or possibly a sequence of related requests, which allow the destination server to infer at least the part of the profile database's content which is relevant to provide a well-targeted service to the user. In the provided example, the book vending service may be enabled to suggest only those books that have not yet been ordered by the user, or which have been written by authors the user has searched for earlier on.

As an optional feature, the proxy system 100 is configured to provide a web portal, accessible through authentication by the user terminal 10. The portal is configured to display any information stored at a given time in the profile database 110, preferably in a structured and editable presentation. The user associated with the user terminal may, using this web interface, amend the data stored in his/her user profile database through addition, deletion or amendment of stored content. Several data items may be grouped together and categorized by the user, who may also upload data files to the user profile database. The proxy system advantageously stores any data files in a dedicated data store, and stores a link to the location of the data file in the profile database. The proxy system 100 may also be configured to automatically categorize data stored in the profile database according to its information content or for example according to its originating source in the communication network.

In a further embodiment of the invention, the proxy system 100 is configured to store data identifying the user terminals 10 in the profile database. This data includes information identifying the terminal device's manufacturer, the operating system running thereon, physical characteristics such as its display size, software applications installed thereon and information describing the use of such software applications by the user. The data may further include information collected by sensors embedded in the user terminals, for example GPS devices, cameras and/or microphones.

The proxy system 100 may for example request the transmission of such data from any terminal that initiates a new session with the proxy. The data may then be periodically updated. This data stemming from local usage of the user terminal further enriches the profile database beyond the data describing the activity of the user terminal on the communication network.

Figure 3:
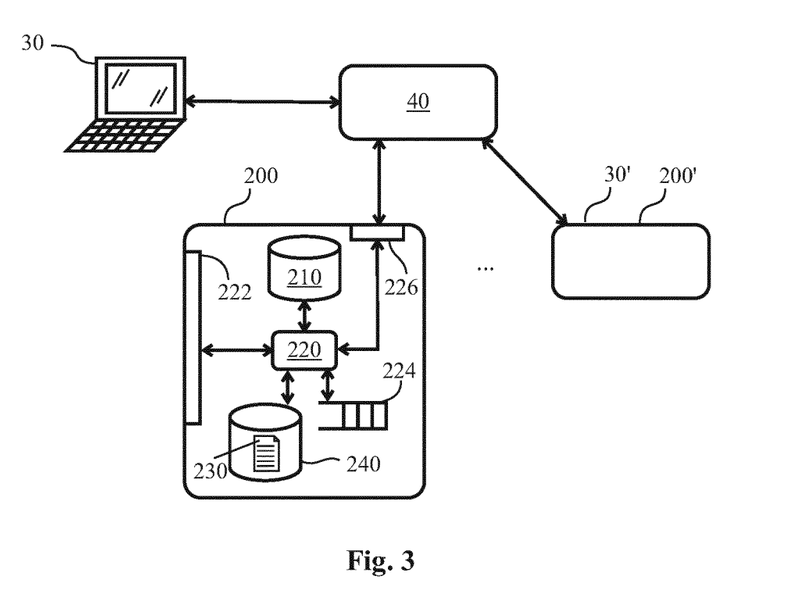
FIG. 3 provides a schematic illustration of a proxy system in accordance with a preferred embodiment of the invention, and its interactions with third parties.

FIG. 3 illustrates a framework in accordance with an embodiment of the invention. The proxy system 200 is similar to the proxy system 100, which has been described in relation with FIG. 100. Neither the user devices 10, nor the destination servers 20 are shown for the sake of clarity. The proxy system comprises a profile database 210 comprising data handled by the proxy system on behalf of a plurality of user terminals associated with a single user. Further, the proxy system 200 comprises predetermined requirements 230 defined by the user associated with the proxy system 200. The set of predetermined requirements is preferably transmitted to the proxy system by way of the aforementioned web interface and it is kept in a data store 240 accessible by the proxy system. The predetermined requirements define conditions according to which data stored in the profile database 210 may be accessed. For example, a condition may define that a particular data item may be accessible to a specific third-party during a predetermined timespan. A plurality of similar proxy systems 200' is depicted. Each proxy system 200, 200' is associated with a different user. A profile consumer 30 or requester is also shown in FIG. 3. The profile consumer is for example a service provider, such as the destination server 20 previously described in the context of FIG. 2. Alternatively, the proxy system 200' of a second user may also be a profile consumer 30' of the profile database 210 of the first user, held by the proxy system 200.

A third party 40 is implemented by a network node, such as a server in the communication network on which said proxy systems and profile consumers reside. The third party keeps a repository of proxy systems in a structured memory element, such as a table. The repository function may be implement using known protocols such as LDAP, SDML, XED, SPML or similar protocols. The repository associates users with their respective proxy system addresses in the communication network, without revealing the addresses of any user terminals. Several users may be categorized together based on the similarity of at least a part of their profiles at the third-party node. In a preferred embodiment, the third-party node 40 also provides an authentication service for authenticating any parties in the communication network, such as the requester 30 and the user associated with the proxy system 200, for example. The third-party node may therefore act as a trusted third party, as known in the art. Alternatively, the authentication function may be implemented by a network node which is separate from said repository node 40. When a new proxy system joins the communication network, it registers first with the repository node 40 by providing it with at least its network address, and information identifying the user that is associated with it.

Figure 4:
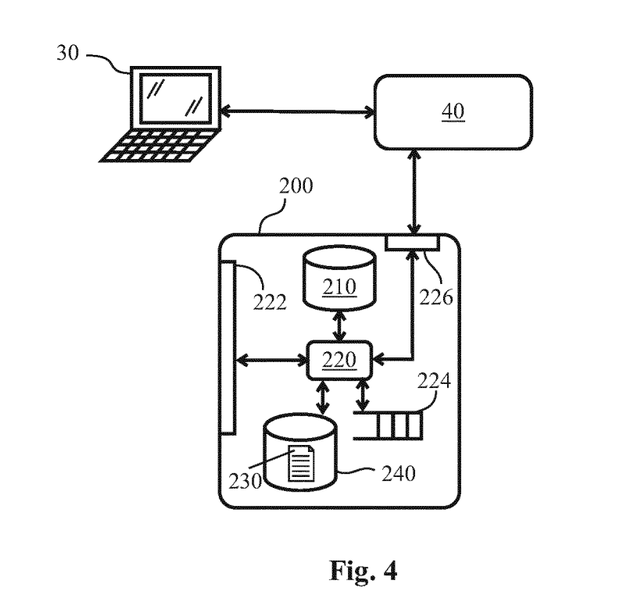
FIG. 4 provides a schematic illustration of a proxy system in accordance with a preferred embodiment of the invention, and its interactions with third parties.

Referring to FIG. 4, the profile consumer 30 contacts the third-party node 40 with a request to get access to data in the profile database of a given user, or of a plurality of users corresponding to a given requested category. The third party contacts the proxy system(s) 200 corresponding to the request, and forwards the request thereto. Upon reception of the profile access request identifying the profile consumer 30, the proxy system 200 checks the request against the set of predetermined requirements 230 in data store 240. The predetermined requirements define which profile consumer on the communication network is granted access to which subset of data contained in the profile database 210. If the request fulfils the predetermined requirements, the corresponding subset of data is read from the profile database 210 for transmission to the requester 30 via the third-party node 40. A reward for granting access to the profile database 210 may further be transmitted from the requester 30 to the proxy system 20. Through the set of predetermined requirements 230, the user, which is associated with any of the user terminals feeding the profile database 210, remains in control of which data, if any, should be made available to which requester. Conversely, the requester is provided with a dataset that is more comprehensive than a dataset or profile it would have been able to establish on its own, without using controlled access through the proxy system.

Figure 5:
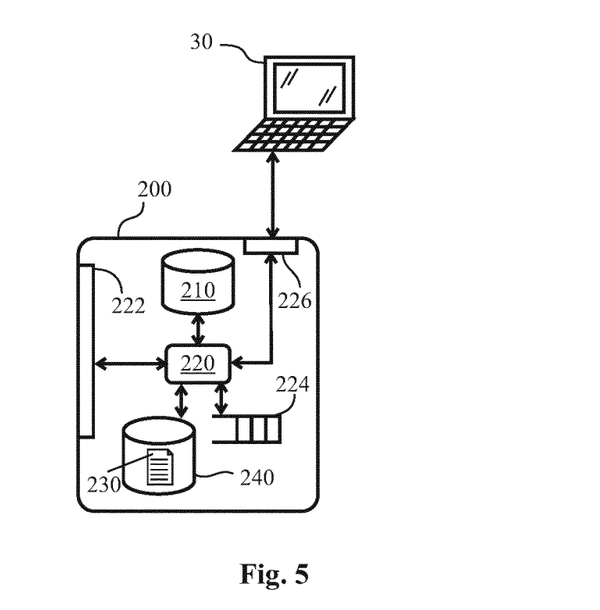
FIG. 5 provides a schematic illustration of a proxy system in accordance with a preferred embodiment of the invention, and its interactions with third parties.

In an alternative embodiment, the profile consumer 30 contacts the third-party repository and authentication node with a request to get access to data in the profile database of a given user, or of a plurality of users corresponding to a given category. The third party authenticates the consumer and provides an authentication certificate, as well as the network address of the corresponding proxy system(s) 200 to the profile consumer. As shown in FIG. 5, the profile consumer 30 then directly requests access to the proxy system. Upon reception of the profile access request identifying the authenticated profile consumer 30, the proxy system 200 checks the request against the set of predetermined requirements 230. The predetermined requirements define which profile consumer on the communication network is granted access to which subset of data contained in the profile database 210. If the request fulfils the predetermined requirements, the corresponding subset of data from the profile database 210 is transmitted to the requester 30.

Figure 6:
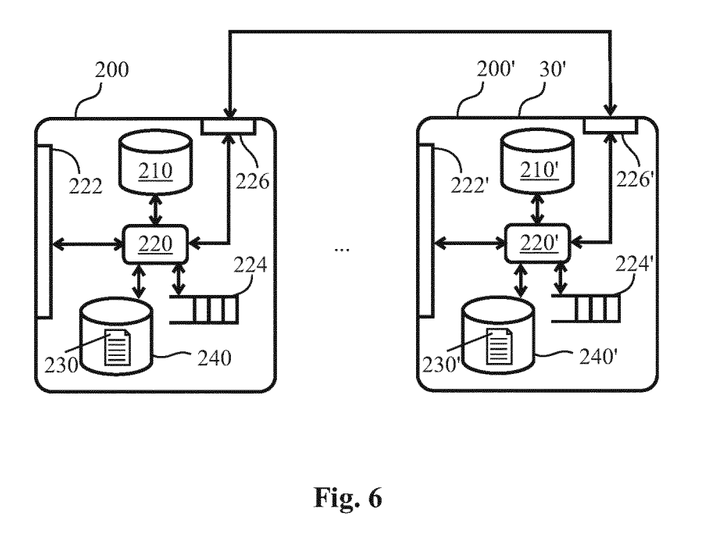
FIG. 6 provides a schematic illustration of a proxy system in accordance with a preferred embodiment of the invention, and its interactions with third parties.

In yet another embodiment, the profile consumer 30' is a proxy system 200' associated with a different user's terminal. The proxy system 200' contacts the third-party repository and authentication node with a request to get access to data in the profile database of a given user, or of a plurality of users corresponding to a given category. The third party authenticates the consumer/proxy system and provides an authentication certificate, as well as the network address of the corresponding proxy system(s) 200 to the profile consumer. As shown in FIG. 6, the profile consumer 30' then directly requests access to the proxy system. Upon reception of the profile access request identifying the authenticated profile consumer 30, the proxy system 200 checks the request against the set of predetermined requirements 230. The predetermined requirements define which profile consumer on the communication network is granted access to which subset of data contained in the profile database 210. If the request fulfils the predetermined requirements, the corresponding subset of data and/or data files from the profile database 210 is transmitted to the requester 30'. By using this architecture, proxy systems 200, 200' establish a peer-to-peer network between users associated with different sets of user terminals. It allows users for example to share, and collaborate on, data stored in the respective profile databases 210, 210' at different times and using different user terminals, without using a centralized or cloud managed platform, which would have to be managed by a supervising third party. Similarly to data files, messages may also be exchanged using the sharing platform that has been described. Further, once two or more proxy systems have been authenticated by a trusted authority, one may act as a proxy system for the other, effectively resulting in daisy-chaining two or more proxy systems in accordance with embodiments of the invention between a user terminal and a destination server. This allows for enhancing the concealment of the user terminal's network address from the destination server.

As an alternative to the third-party node 40 shown in the embodiments of FIGS. 3 to 6, a blockchain may be used. A plurality of interconnected peer nodes that are distributed in the communication network keep a copy of the blockchain and maintain its validity through a distributed consensus algorithm. Each time a new proxy system joins the communication network, the corresponding user's ownership is recorded as a transaction in the blockchain. The transaction record comprises any information that is necessary to connect the new proxy, so that the blockchain acts as a Domain Name Service, DNS, among all the proxy systems in the communication network. The transaction record further comprises information identifying the user associated with the user terminals that feed the profile database managed by the proxy system. Every profile consumer or requester node in the communication network is able to consult the blockchain and request access to a profile database directly at the corresponding proxy system. The blockchain is advantageously also used to store transaction records documenting the rewards to each user for the access of her/his profile database.

It should be noted that features described for a specific embodiment described herein may be combined with the features of other embodiments unless the contrary is explicitly mentioned. Based on the description and figures that has been provided, a person with ordinary skills in the art will be enabled to develop a computer program for implementing the described methods without undue burden.

It should be understood that the detailed description of specific preferred embodiments is given by way of illustration only, since various changes and modifications within the scope of the invention will be apparent to the person skilled in the art. The scope of protection is defined by the following set of claims.

The invention claimed is:

1. A computer-implemented method for handling data traffic, comprising:
   establishing a data connection between a user terminal that is associated with specific user and a proxy system;
   handling data traffic that is received by the proxy system from the user terminal or sent from the proxy system to the user terminal, wherein the data traffic is sent to at least one destination server or received from the at least one destination server through a communication network, wherein the proxy system receives the data traffic on behalf of the user terminal;
   maintaining a profile database on the proxy system that stores data that describes the user terminal's activity as well as an activity of other terminals associated with the user on the communication network;
   concealing data on the proxy system that describes a previous activity of any of the terminals associated with the user on the communication network from the destination server to avoid online tracking of the user, wherein the concealed data has been handled by the proxy system; and
   receiving a request to access the profile database from a third-party network node and conditionally granting the third-party node access to at least a part of the data stored on the database based on predetermined requirements, wherein the proxy system handles data traffic and maintains a profile database in relation with the terminals associated with a particular user, wherein a proxy system repository stores data that identifies the proxy system on the communication network and associates the proxy system with the user, and wherein the proxy system repository stores data that identifies a plurality of proxy systems on the communication network and associates each of the plurality of proxy systems with a respective user.

2. The computer-implemented method of claim 1, further including:
   generating at least one virtual machine environment associated with the user upon establishing the data connection between the user terminal and the proxy system, wherein the virtual machine environment handles data traffic between the user terminal and at least one destination server through the communication network and stores data describing the activity of the user on the communication network within the virtual machine environment, wherein the proxy system maintains data on the profile database that describes the activity of each virtual machine environment associated with the user on the communication network, wherein data describing the previous activity of any virtual machine environment associated with the user is concealed from the destination server.

3. The computer-implemented method of claim 1, wherein handling data traffic that is received by the proxy system from the user terminal or sent from the proxy system to the user terminal includes:
   receiving a first request at the proxy system from the terminal that is addressed to a destination server and includes first data;

retrieving second data that is related to the first data from the profile database using data processing means at the proxy system; and forwarding at least one second request from the proxy system to the destination server, wherein the at least one second request includes the first data and the second data.

4. The computer-implemented method of claim 1, wherein the proxy system conceals at least part of data identifying the user terminal.

5. The computer-implemented method of claim 1, further including:

collecting data through the user terminal that describes the user terminal's local activity and transmitting the data collected through the user terminal to the proxy system; and receiving the data describing the user terminal's local activity at the proxy system and storing at least part of the data describing the user terminal's local activity on the profile database.

6. The computer-implemented method of claim 5, wherein the data describing the user terminal's local activity includes information that pertains to applications that are executed on the user terminal.

7. The computer-implemented method of claim 1, wherein the data traffic handled by the proxy system includes at least one of: world-wide-web data traffic and e-mail data traffic.

8. The computer-implemented method of claim 1, wherein the data stored on the profile database includes at least one of: a web-browsing history of any of the terminals that are associated with the user and data that is included within cookies set by destination servers that are contacted by any of the terminals.

9. The computer-implemented method of claim 1, wherein the data stored upon the profile database includes data files that are transmitted by any terminal associated with the user terminal to the proxy system.

10. The computer-implemented method of claim 1, wherein the proxy system grants access to a predetermined part of the data stored on the profile database to a predetermined third party subject to the authentication of the third party.

11. The computer-implemented method of claim 10, wherein the authentication of the third party is performed by the trusted authentication node on the communication network.

12. The computer-implemented method of claim 10, wherein the third party is a proxy system that is associated with a different user.

13. The computer-implemented method of claim 1, wherein the proxy system includes at least one computing node in the communication network which is remotely accessible from the user terminal.

14. The computer-implemented method of claim 1, wherein the proxy system includes a device that is physically interfaceable with the user terminal.

15. The computer-implemented method of claim 1, wherein the user terminal includes a computing device, a communication device such as a smartphone, or an electronic device that is connected to the communication network, wherein the electronic device is associated with the user.

16. A system for handling data traffic comprising a communication interface, at least one memory element and a processor, wherein the processor is configured for:

establishing, using the communication interface, a data connection to a user terminal, which is associated with a specific user;

handling data traffic that is received by the proxy system from the user terminal or sent from the proxy system to the user terminal, wherein the data traffic is sent to at least one destination server or received from the at least one destination server through a communication network, wherein the proxy system receives the data traffic on behalf of the user terminal;

maintaining a profile database that stores data that describes the user terminal's activity as well as an activity of other terminals associated with the user on the communication network;

concealing data that describes a previous activity of any of the terminals associated with the user on the communication network from the destination server to avoid online tracking of the user, wherein the concealed data has been handled by the system;

receiving a request to access the profile database from a third-party network node and conditionally granting the third-party node access to at least a part of the data stored on the database based on predetermined requirements; and generating at least one virtual machine environment associated with the user upon establishing the data connection between the user terminal and the proxy system, wherein the virtual machine environment handles data traffic between the user terminal and at least one destination server on the communication network and stores data describing the activity of the user on the communication network within the virtual machine environment, wherein the proxy system maintains data on the profile database that describes the activity of each virtual machine environment associated with the user on the communication network, wherein data describing the previous activity of any virtual machine environment associated with the user is concealed from the destination server.

17. The system of claim 16, wherein the system is distributed among a plurality of computing nodes in the communication network.

18. A non-transitory computer readable storage medium storing instructions that when executed by a computer, which includes a processor perform a method, the method comprising:

establishing a data connection between a user terminal that is associated with a specific user and a proxy system;

handling data traffic that is received by the proxy system from the user terminal or sent from the proxy system to the user terminal, wherein the data traffic is sent to at least one destination server or received from the at least one destination server through a communication network, wherein the proxy system receives the data traffic on behalf of the user terminal;

maintaining a profile database on the proxy system that stores data that describes the user terminal's activity as well as an activity of other terminals associated with the user on the communications network;

concealing data on the proxy system that describes a previous activity of any of the terminals associated with the user on the communication network from the destination server to avoid online tracking of the user, wherein the concealed data has been handled by the proxy system;

receiving a request to access the profile database from a third-party network node and conditionally granting the third-party node access to at least a part of the data stored on the database based on predetermined requirements; and generating at least one virtual machine environment associated with the user upon establishing the data connection between the user terminal and the proxy system, wherein the virtual machine environment handles data traffic between the user terminal and at least one destination server on the communication network and stores data describing the activity of the user on the communication network within the virtual machine environment, wherein the proxy system maintains data on the profile database that describes the activity of each virtual machine environment associated with the user on the communication network, wherein data describing the previous activity of any virtual machine environment associated with the user is concealed from the destination server.

* * * * *